US012717252B2

(12) United States Patent
Tamura et al.

(10) Patent No.: US 12,717,252 B2
(45) Date of Patent: Aug. 25, 2026

(54) EXTERNAL ADDITIVE FOR TONER AND TONER

(71) Applicant: CANON KABUSHIKI KAISHA, Tokyo (JP)

(72) Inventors: Junichi Tamura, Ibaraki (JP); Ichiro Kanno, Chiba (JP); Yukihiro Abe, Chiba (JP); Mari Kaburagi, Chiba (JP); Hayato Ida, Ibaraki (JP); Masao Suzuki, Kanagawa (JP); Kei Inoue, Kanagawa (JP); Waka Hasegawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 462 days.

(21) Appl. No.: 18/511,662

(22) Filed: Nov. 16, 2023

(65) Prior Publication Data

US 2024/0176258 A1 May 30, 2024

(30) Foreign Application Priority Data

Nov. 17, 2022 (JP) ................................. 2022-183913

(51) Int. Cl.
*G03G 9/087* (2006.01)
*G03G 9/08* (2006.01)

(52) U.S. Cl.
CPC ......... *G03G 9/0812* (2013.01); *G03G 9/0808* (2013.01); *G03G 9/0819* (2013.01)

(58) Field of Classification Search
CPC ........... G03G 9/09725; G03G 9/09716; G03G 9/9775; G03G 9/09708
See application file for complete search history.

(56) References Cited

U.S. PATENT DOCUMENTS

| | | | | |
|---|---|---|---|---|
| 9,809,682 | B2 * | 11/2017 | Ishizu | G03G 9/09725 |
| 2014/0295341 | A1 | 10/2014 | Fomitchev | |
| 2021/0286281 | A1 | 9/2021 | Nishikawa | |
| 2022/0187728 | A1 | 6/2022 | Miura | |
| 2022/0236656 | A1 | 7/2022 | Kanno | |

FOREIGN PATENT DOCUMENTS

| | | | |
|---|---|---|---|
| EP | 3674800 | A1 | 7/2020 |
| EP | 3929659 | A1 | 12/2021 |
| EP | 3674804 | B1 | 6/2022 |
| JP | 5522859 | B2 | 6/2014 |
| JP | 5982003 | B2 | 8/2016 |
| JP | 2016163866 | A | 9/2016 |
| JP | 6116711 | B2 | 4/2017 |
| JP | 2020012943 | A | 1/2020 |
| JP | 2021533239 | A | 12/2021 |
| WO | 2020/033357 | A1 | 2/2020 |

* cited by examiner

*Primary Examiner* — Peter L Vajda
(74) *Attorney, Agent, or Firm* — Canon U.S.A., Inc. IP Division

(57) ABSTRACT

The external additive for toner includes an external additive particle containing: a base particle A; and a plurality of convex forming particles B each configured to form a convex portion on a surface of the base particle A. The base particle A and the convex forming particles B are particles each containing a silicon compound having a siloxane bond, and a chemical bond is formed between the base particle A and each of the convex forming particles B. The base particle A and the convex forming particles B each have a total content of the following unit (a), unit (b), and unit (c) of 80 mass % or more and 100 mass % or less:

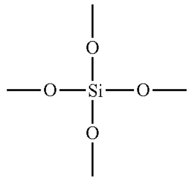

(a)

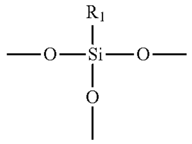

(b)

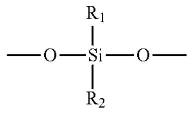

(c)

where $R_1$ and $R_2$ each represent an alkyl group having 1 or more and 6 or less carbon atoms.

7 Claims, No Drawings

EXTERNAL ADDITIVE FOR TONER AND TONER

BACKGROUND

Field of the Disclosure

The present disclosure relates to an external additive for toner and a toner.

Description of the Related Art

In recent years, along with widespread use of a full-color copying machine of an electrophotographic system, a toner used for electrophotography has been increasingly required to respond to an increase in printing speed and to have a longer life.

In general, spherical silica or the like has hitherto been widely known as an external additive used in a toner. However, there is a problem in that, under an environment in which a toner is brought into frequent contact with a member such as a carrier to receive a stress as in a case in which images each having a low print density are output for a long period of time, silica is embedded into the surface of the toner to deteriorate the adhesive force of the toner. In view of the foregoing, in Japanese Patent No. 6116711, the embedding of the external additive is suppressed through use of an external additive of silicone.

Further, in Japanese Patent No. 5522859, an adhesion property is improved and separation is suppressed by forming a network protruding portion.

The use of silicone as the external additive as in Japanese Patent No. 6116711 suppresses the embedding of the external additive into the toner to decrease the contact area between the external additive and a toner base, with the result that the external additive is separated from the toner base. Thus, there is room for improvement of the foregoing. In addition, in the toner to which an organosilicone fine particle including a network protruding portion is externally added in order to relieve the separation as in Japanese Patent No. 5522859, when the protruding portion is low, the organosilicone fine particle rolls on the surface of the toner base to come close to a concave portion. Thus, there is room for improvement from the viewpoint of the deterioration of the adhesive force of the toner. Meanwhile, when the protruding portion is high, there is room for improvement from the same viewpoint as that of aggregated particles.

SUMMARY

An object of the present disclosure is to provide an external additive and a toner that solve the above-mentioned problems. Specifically, an object of the present disclosure is to provide an external additive and a toner that have excellent durable stability, are excellent in charge rising property, and enable a high-quality image to be obtained for a long period of time.

The present disclosure provides an external additive for toner comprising an external additive particle containing:

a base particle A; and a plurality of convex forming particles B each configured to form a convex portion on a surface of the base particle A, wherein the base particle A and the plurality of convex forming particles B are particles each containing a silicon compound having a siloxane bond, and a chemical bond is formed between the base particle A and each of the plurality of convex forming particles B, wherein the base particle A has a total content of the following unit (a), unit (b), and unit (c) of 80 mass % or more and 100 mass % or less, wherein the plurality of convex forming particles B each have a total content of the following unit (a), unit (b), and unit (c) of 80 mass % or more and 100 mass % or less, wherein the external additive for toner has a Young's modulus of 10 GPa or more and 30 GPa or less, wherein the external additive for toner has a number-average particle diameter of 0.03 μm or more and 0.30 μm or less, and wherein, when the number-average particle diameter of the external additive for toner is represented by $D_A$, and an average height of the convex portions derived from the plurality of convex forming particles B on a surface of the external additive particle is represented by H, $H/D_A$ is 0.10 or more and 0.30 or less:

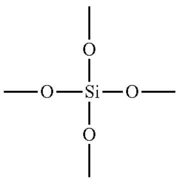

(a)

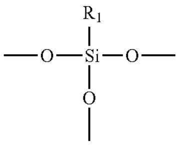

(b)

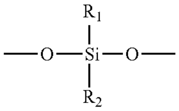

(c)

where $R_1$ and $R_2$ each represent an alkyl group having 1 or more and 6 or less carbon atoms.

In addition, the present disclosure provides a toner comprising: a toner particle; and the external additive for toner having the above structure.

Further features of the present disclosure will become apparent from the following description of exemplary embodiments.

DESCRIPTION OF THE EMBODIMENTS

In the present disclosure, the description "○○ or more and xx or less" or "from ○○ to xx" representing a numerical range means a numerical range including a lower limit and an upper limit that are end points unless otherwise stated. Further, as used herein, "(a)" may refer to the content ratio of the unit (a) in the base particle A and each of the plurality of convex forming particles B, "(b)" may refer to the content ratio of the unit (b) in the base particle A and each of the plurality of convex forming particles B, and "(c)" may refer to the content ratio of the unit (c) in the base particle A and each of the plurality of convex forming particles B.

The inventors of the present disclosure conceive that the mechanism via which the effect of the present disclosure is expressed is as described below.

A particle having a network convex portion, which has hitherto been used as an external additive for toner, is effective in improving the adhesion property to a toner particle. However, the contact area of the particle having a high network convex portion with a member such as a carrier is significantly decreased, and the particle is not easily charged. As a result, for example, when an image having a high image ratio is output after the state in which an image having a low image ratio is output and the charge of a toner in a developing unit is saturated, charge becomes different between the toner having the charge saturated in the developing unit and a toner to be newly supplied into the developing unit, with the result that a change in density is increased. Thus, there is room for improvement of the foregoing. In addition, when a particle having a low network convex portion is deformed by rubbing against the member such as a carrier, the effect of the convex portion is hardly obtained, and the particle rolls on the surface of a toner base to come close to a concave portion of the toner. Thus, there is room for improvement from the viewpoint of the deterioration of developability and transferability caused by the deterioration of the adhesive force of the toner convex portion that is brought into contact with the member such as a carrier.

In view of the foregoing, the inventors have made extensive investigations, and as a result, have found that, when the convex portion of the external additive is formed on an external additive base so as to have a shape of an independent particle, and the size of the convex portion with respect to the particle diameter of the base is optimized, the above-mentioned problems can be solved. Thus, the present disclosure has been completed. Although this mechanism is not clear, the inventors have assumed as described below. When the convex portion is independent and has an appropriate size, the contact area between the convex portion and the toner base is increased, and the rolling of the external additive on the toner base is also suppressed while the separation of the external additive is suppressed. Thus, the developability and transferability are satisfactorily maintained, and the charge rising can also be improved by deformation at the time of rubbing against the member such as a carrier.

[External Additive for Toner]

The external additive for toner of the present disclosure is an external additive for toner comprising an external additive particle containing:

a base particle A; and a plurality of convex forming particles B each configured to form a convex portion on a surface of the base particle A, wherein the base particle A and the plurality of convex forming particles B are particles each containing a silicon compound having a siloxane bond, and a chemical bond is formed between the base particle A and each of the plurality of convex forming particles B, wherein the base particle A has a total content of the following unit (a), unit (b), and unit (c) of 80 mass % or more and 100 mass % or less, wherein the plurality of convex forming particles B each have a total content of the following unit (a), unit (b), and unit (c) of 80 mass % or more and 100 mass % or less, wherein the external additive for toner has a Young's modulus of 10 GPa or more and 30 GPa or less, wherein the external additive for toner has a number-average particle diameter of 0.03 μm or more and 0.30 μm or less, and wherein, when the number-average particle diameter of the external additive for toner is represented by $D_A$, and an average height of the convex portions derived from the plurality of convex forming particles B on a surface of the external additive particle is represented by H, $H/D_A$ is 0.10 or more and 0.30 or less:

(a)

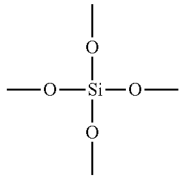

(b)

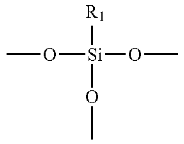

(c)

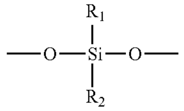

where $R_1$ and $R_2$ each represent an alkyl group having 1 or more and 6 or less carbon atoms.

The external additive for toner of the present disclosure has a number-average particle diameter of a primary particle of 0.03 μm or more and 0.30 μm or less. When the number-average particle diameter of the primary particle falls within the above-mentioned range, the toner particle can be uniformly coated with the fine particle. In addition, the stress on the toner can be suppressed, and hence the effect of charging stability is easily obtained. In the case where the number-average particle diameter of the primary particle of the fine particle is less than 0.03 μm, when images each having a low print density are output in a large number over a long period of time, the stress on the toner is increased, and hence there is a risk in that an external additive particle is liable to be embedded into the surface of the toner. In addition, when the number-average particle diameter of the primary particle is more than 0.30 μm, there is a risk in that the external additive particle is liable to be separated from the surface of the toner. The number-average particle diameter of the primary particle of the external additive may be increased by lowering a reaction temperature, shortening a reaction time, and increasing the amount of a catalyst in each of a hydrolysis step and a polycondensation step. In addition, the number-average particle diameter of the primary particle of the fine particle may be decreased by increasing the reaction temperature, lengthening the reaction time, and decreasing the amount of the catalyst in each of the hydrolysis step and the polycondensation step.

The number-average particle diameter of the primary particle of the external additive is preferably 0.07 μm or more and 0.20 μm or less, more preferably 0.08 μm or more and 0.15 μm or less from the above-mentioned viewpoints.

The external additive for toner of the present disclosure has a Young's modulus of 10 GPa or more and 30 GPa or less. In the case where the Young's modulus falls within the above-mentioned range, when the toner receives a stress from a member such as a carrier, the stress is alleviated, and the embedding of the external additive into the surface of the toner particle can be further suppressed.

In the case where the Young's modulus is 10 GPa or more, when the toner receives a stress from a member such as a carrier, the external additive itself is less liable to be fractured. In addition, in the case where the Young's modulus is 30 GPa or less, when the toner receives a stress from a member such as a carrier, the stress is easily alleviated, and the embedding of the external additive into the surface of the toner particle can be further suppressed. Accordingly, the state of the toner surface is less liable to be changed, and changes in chargeability and adhesive force of the toner can be further suppressed.

The Young's modulus of the external additive for toner may be controlled by changing the mixing ratios of the above-mentioned monomers, and the temperature, the time, the pH, and the kind of the catalyst in each of the hydrolysis step and the polycondensation step. For example, the Young's modulus may be increased by increasing the mixing ratio of a silane monomer having the structure (a), decreasing the mixing ratios of silane monomers having the structures (b) and (c), increasing the temperature in each of the hydrolysis step and the polycondensation step, lengthening the time of each of the hydrolysis step and the polycondensation step, increasing the pH in each of the hydrolysis step and the polycondensation step, or the like. The Young's modulus may be decreased by decreasing the mixing ratio of the silane monomer having the structure (a), increasing the mixing ratios of the silane monomers having the structures (b) and (c), lowering the temperature in each of the hydrolysis step and the polycondensation step, shortening the time of each of the hydrolysis step and the polycondensation step, decreasing the pH in each of the hydrolysis step and the polycondensation step, or the like. The Young's modulus of the external additive for toner is preferably 13 GPa or more and 20 GPa or less.

The total content of the following unit (a), unit (b), and unit (c) in each of a base particle A and a convex forming particle B of the external additive for toner of the present disclosure is 80 mass % or more and 100 mass % or less:

(a)

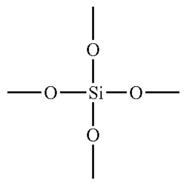

(b)

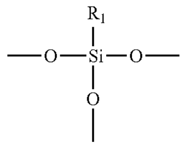

(c)

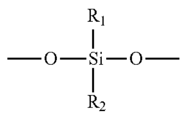

where $R_1$ and $R_2$ each represent an alkyl group having 1 or more and 6 or less carbon atoms.

In the case where the total content falls within the above-mentioned range and the Young's modulus falls within the above-mentioned range, when the toner receives a stress from a member such as a carrier, the external additive itself is less liable to be fractured. Further, due to the appropriate flexibility, the embedding of the external additive into the surface of the toner particle can be suppressed. Thus, the toner surface state is less liable to be changed, and the changes in chargeability and adhesive force of the toner can be further suppressed. The content ratios of the above-mentioned unit (a), unit (b), and unit (c) in the external additive may be controlled by the addition amount of the above-mentioned monomer.

The content ratios of the unit (a), the unit (b), and the unit (c) in the base particle A and those in the convex forming particle B may be the same or different from each other as long as the Young's modulus can be set to fall within the above-mentioned range.

In addition, it is more preferred that the content ratio of the unit (a) in the convex forming particle B be larger than that in the base particle A. It is preferred that the unit (a) be contained in the convex forming particle B in a larger amount as compared to the base particle A because the convex portion becomes appropriately hard and the convex portion of the external additive is embedded into the toner particle, with the result that the rolling of the external additive can be further suppressed and the separation thereof can also be suppressed.

When a number-average particle diameter of the external additive for toner of the present disclosure is represented by $D_A$, and an average height of the convex portions derived from the convex forming particles B on the surface of the external additive particle is represented by H, $H/D_A$ is 0.10 or more and 0.30 or less. When the $H/D_A$ falls within the above-mentioned range, the adhesive force of the external additive with respect to the toner base is improved, the separation thereof is suppressed, the rolling thereof on the surface of the toner base is suppressed, the contact area is sufficiently obtained at the time of rubbing against the member such as a carrier, and the charge rising property can also be improved. Further, it is more preferred that the $H/D_A$ be 0.15 or more and 0.25 or less because the above-mentioned effects are more easily obtained. The number-average particle diameter $D_A$ of the external additive for toner may be controlled by adjusting the reaction conditions in the hydrolysis and polycondensation steps described later. The average height H of the convex portions may be controlled by the particle diameter of the convex forming particle B, the addition amount and time of the convex forming particle B at the time of production of the external additive for toner, and the reaction time and reaction temperature between the convex forming particle B and a monomer for forming the base particle A.

Methods of measuring the above-mentioned various physical property values are described later.

<Production Method>

A method of producing the external additive for toner of the present disclosure is not particularly limited, but it is preferred that the particles be formed through the hydrolysis and polycondensation reactions of a silicon compound (silane monomer) by a sol-gel method. Specifically, it is preferred that a mixture of a bifunctional silane having two siloxane bonds and a tetrafunctional silane having four siloxane bonds be subjected to hydrolysis and polycondensation to produce base particles A, and fine particles (convex forming particles B) of a silicon compound having a siloxane bond produced in advance by the similar method be allowed to react with the base particles A to provide composite particles in which a chemical bond is formed between each of the base particles A and each of the convex forming particles B. The silane monomers, such as the bifunctional silane and the tetrafunctional silane, are described later. The ratio of the bifunctional silane is preferably 30 mol % or more and 70 mol % or less, more preferably 40 mol % or more and 60 mol % or less. The ratio of the tetrafunctional silane is preferably 30 mol % or more and 80 mol % or less, more preferably 40 mol % or more and 70 mol % or less.

The external additive for toner of the present disclosure is a particle containing a silicon compound having a siloxane bond as a binder.

A method of producing the silicon compound in the present disclosure is not particularly limited, and the silicon compound may be obtained, for example, by adding a silane compound dropwise to water, subjecting the resultant to hydrolysis and polycondensation reactions with a catalyst, and then filtering and drying the resultant suspension. The particle diameter of the silicon compound may be controlled by the kind of a catalyst, a blending ratio, a reaction starting temperature, a dropping time, and the like. Examples of the catalyst include, but not limited to: acidic catalysts, such as hydrochloric acid, hydrofluoric acid, sulfuric acid, and nitric acid; and basic catalysts, such as ammonia water, sodium hydroxide, and potassium hydroxide.

It is preferred that the silicon compound in the present disclosure be produced by the following method. Specifically, it is preferred that the method include: a first step of obtaining a hydrolysate of a silicon compound; a second step of mixing the hydrolysate with an alkaline aqueous medium and colloidal silica to subject the hydrolysate to a polycondensation reaction and a reaction with the colloidal silica; and a third step of mixing the polycondensation reaction product with an aqueous solution, followed by particle formation. In some cases, a hydrophobizing agent may be further blended therein.

In the first step, the silicon compound and the catalyst are brought into contact with each other by a method, such as stirring or mixing, in an aqueous solution in which an acidic or alkaline substance serving as a catalyst is dissolved in water. A known catalyst may be suitably used as the catalyst. Specific examples of the catalyst include: acid catalysts, such as acetic acid, hydrochloric acid, hydrofluoric acid, sulfuric acid, and nitric acid; and basic catalysts, such as ammonia water, sodium hydroxide, and potassium hydroxide.

The usage amount of the catalyst may be appropriately adjusted in accordance with the kinds of the silicon compound and the catalyst. The usage amount is preferably selected in a range of $1\times10^{-3}$ part by mass or more and 1 part by mass or less with respect to 100 parts by mass of water used in the hydrolysis of the silicon compound.

When the usage amount of the catalyst is $1\times10^{-3}$ part by mass or more, the reaction sufficiently proceeds. Meanwhile, when the usage amount of the catalyst is 1 part by mass or less, the concentration of the catalyst remaining as an impurity in the fine particle becomes low, and the hydrolysis can be easily performed. The usage amount of the water is preferably 2 mol or more and 15 mol or less with respect to 1 mole of the silicon compound. When the amount of the water is 2 mol or more, the hydrolysis reaction sufficiently proceeds. When the amount of the water is 15 mol or less, the productivity is improved.

The reaction temperature is not particularly limited, and the reaction may be performed at normal temperature or in a heated state. However, it is preferred that the reaction be performed under a state in which the temperature is kept at from 10° C. to 60° C. because a hydrolysate is obtained in a short period of time, and the partial condensation reaction of the produced hydrolysate can be suppressed. The reaction time is not particularly limited and may be appropriately selected in consideration of the reactivity of the silicon compound to be used, the composition of a reaction liquid prepared by blending the silicon compound with an acid and water, and the productivity.

In the method of producing the silicon polymer particle, as the second step, the raw material solution obtained in the first step is mixed with an alkaline aqueous medium to subject a particle precursor to a polycondensation reaction. Thus, a polycondensation reaction liquid is obtained. Here, the alkaline aqueous medium is a liquid obtained by mixing an alkali component, water, and as required, an organic solvent and the like.

An alkali component used in the alkaline aqueous medium exhibits basicity in its aqueous solution, and acts as a neutralizer for the catalyst used in the first step and as a catalyst for the polycondensation reaction in the second step. Examples of such alkali component may include: alkali metal hydroxides, such as lithium hydroxide, sodium hydroxide, and potassium hydroxide; ammonia; and organic amines, such as monomethylamine and dimethylamine.

The usage amount of the alkali component is such an amount that the alkali component neutralizes an acid and effectively acts as a catalyst for the polycondensation reaction. For example, when ammonia is used as the alkali component, its usage amount is usually selected in a range of 0.01 part by mass or more and 12.5 parts by mass or less with respect to 100 parts by mass of a mixture of the water and the organic solvent.

In the second step, in order to prepare the alkaline aqueous medium, the organic solvent may be further used in addition to the alkali component and the water. The organic solvent is not particularly limited as long as the organic solvent has compatibility with the water, but an organic solvent that dissolves 10 g or more of the water per 100 g at normal temperature and normal pressure is suitable.

Specific examples thereof include: alcohols, such as methanol, ethanol, n-propanol, 2-propanol, and butanol; polyhydric alcohols, such as ethylene glycol, diethylene glycol, propylene glycol, glycerin, trimethylolpropane, and hexanetriol; ethers, such as ethylene glycol monoethyl ether, acetone, diethyl ether, tetrahydrofuran, and diacetone alcohol; and amide compounds, such as dimethylformamide, dimethylacetamide, and N-methylpyrrolidone.

Of the organic solvents listed above, alcohol-based solvents, such as methanol, ethanol, 2-propanol, and butanol, are preferred. Further, from the viewpoints of hydrolysis and a dehydration condensation reaction, it is more preferred to select, as the organic solvent, the same alcohol as an alcohol to be generated as an elimination product.

In the third step, the polycondensation reaction product obtained in the second step and an aqueous solution are mixed, followed by particle formation. Water (e.g., tap water or pure water) may be suitably used as the aqueous solution, but a component exhibiting compatibility with water, such as a salt, an acid, an alkali, an organic solvent, a surfactant, or a water-soluble polymer, may be further added to the water. The temperature of each of the polycondensation reaction liquid and the aqueous solution at the time of the mixing is not particularly restricted, and is preferably selected in a range of from 5° C. to 70° C. in consideration of the composition thereof, the productivity, and the like.

A known method may be used as a method of recovering the particle without any particular limitation. There are given, for example, a method involving scooping up floating powder and a filtration method. Of those, a filtration method is preferred because its operation is simple. The filtration method is not particularly limited, and any known device for vacuum filtration, centrifugal filtration, or pressure filtration, or the like may be selected. Filter paper, a filter, a filter cloth, and the like used in the filtration are not particularly limited as long as they are industrially available, and may be appropriately selected in accordance with a device to be used.

The monomer to be used may be appropriately selected depending on, for example, compatibility with the solvent and the catalyst, or hydrolyzability. Examples of a tetrafunctional silane monomer having the structure (a) include tetramethoxysilane, tetraethoxysilane, and tetraisocyanatosilane. Of those, tetraethoxysilane is preferred.

Examples of a trifunctional silane monomer having the structure (b) include methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, methyldiethoxyhydroxysilane, ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, hexyltrihydroxysilane, phenyltrimethoxysilane, phenyltriethoxysilane, phenyltrichlorosilane, phenyltriacetoxysilane, and phenyltrihydroxysilane. Of those, methyltrimethoxysilane is preferred.

Examples of a bifunctional silane monomer having the structure (c) include di-tert-butyldichlorosilane, di-tert-butyldimethoxysilane, di-tert-butyldiethoxysilane, dibutyldichlorosilane, dibutyldimethoxysilane, dibutyldiethoxysilane, dichlorodecylmethylsilane, dimethoxydecylmethylsilane, diethoxydecylmethylsilane, dichlorodimethylsilane, dimethoxydimethylsilane, diethoxydimethylsilane, and diethyldimethoxysilane. Of those, dimethoxydimethylsilane is preferred.

Other Physical Properties of External Additive for Toner

The true specific gravity of the external additive for toner of the present disclosure is preferably 1.00 g/cm$^3$ or more and 1.60 g/cm$^3$ or less. In the case where the true specific gravity falls within the above-mentioned range, when the toner receives a stress from a member such as a carrier, the embedding of the external additive into the toner particle surface and the fracture of the external additive itself can be suppressed. The true specific gravity of the external additive may be controlled by the addition amount of the fine particles B. The true specific gravity of the external additive for toner is more preferably 1.20 g/cm$^3$ or more and 1.40 g/cm$^3$ or less.

In the external additive for toner of the present disclosure, when the average maximum diameter of the convex forming particles B is represented by $D_B$, $H/D_B$ is preferably 0.30 or more and 0.50 or less with respect to the average height H of the convex portions derived from the convex forming particles B. It is preferred that the $H/D_B$ fall within the above-mentioned range because the adhesive force of the external additive with respect to the toner base is sufficiently obtained, and the rolling thereof is also suppressed. When the $H/D_B$ is less than 0.30, the rolling cannot be sufficiently suppressed. When the $H/D_B$ is more than 0.50, the contact area with respect to the toner base is decreased, and the external additive is liable to be separated. The $H/D_B$ may be controlled by the particle diameter of the convex forming particle B, the addition amount and time of the convex forming particle B at the time of production of the external additive for toner, and the reaction time and reaction temperature between the convex forming particle B and a monomer for forming the base particle A.

It is preferred that the surface of the external additive for toner of the present disclosure be subjected to surface treatment with a hydrophobic treatment agent. The hydrophobic treatment agent is not particularly limited but is preferably an organosilicon compound.

Examples thereof may include: alkylsilazane compounds such as hexamethyldisilazane: alkylalkoxysilane compounds, such as diethyldiethoxysilane, trimethylmethoxysilane, methyltrimethoxysilane, and butyltrimethoxysilane; fluoroalkylsilane compounds such as trifluoropropyltrimethoxysilane: chlorosilane compounds, such as dimethyldichlorosilane and trimethylchlorosilane; siloxane compounds such as octamethylcyclotetrasiloxane: silicon oil; and silicon varnish.

Through the hydrophobic treatment of the surface of the external additive for toner, a change in adhesive force of the toner after endurance can be suppressed. In particular, the fine particle is preferably subjected to surface treatment with at least one compound selected from the group consisting of: an alkylsilazane compound; an alkylalkoxysilane compound; a chlorosilane compound; a siloxane compound; and a silicone oil. Further, the external additive for toner is more preferably subjected to surface treatment with the alkylsilazane compound from the above-mentioned viewpoint.

It is preferred that the content ratios of the above-mentioned unit (a), unit (b), and unit (c) in the base particle A and the convex forming particle B of the external additive for toner of the present disclosure satisfy the following expressions (I), (II), and (III).

$$0.30 \leq (a)/((a)+(b)+(c)) \leq 0.80 \quad \text{(I)}$$

$$0 \leq (b)/((a)+(b)+(c)) \leq 0.50 \quad \text{(II)}$$

$$0.20 \leq (c)/((a)+(b)+(c)) \leq 0.70 \quad \text{(III)}$$

In the case where the content ratios fall within the above-mentioned ranges, when the toner receives a stress from a member such as a carrier, the embedding of the external additive into the toner particle surface and the fracture of the external additive itself can be suppressed. Further, it is more preferred that the following expressions be satisfied from the viewpoint of durable stability of the toner because the amount of Si—$CH_3$ present in the external additive becomes optimum.

$$0.40 \leq (a)/((a)+(b)+(c)) \leq 0.70 \quad \text{(I')}$$

$$0 \leq (b)/((a)+(b)+(c)) \leq 0.10 \quad \text{(II')}$$

$$0.30 \leq (c)/((a)+(b)+(c)) \leq 0.60 \quad \text{(III')}$$

The content ratios in the base particle A and those in the convex forming particle B may be the same or different from each other as long as the content ratios fall within the above-mentioned ranges.

The content of the external additive for toner of the present disclosure is preferably 0.1 part by mass or more and 20.0 parts by mass or less with respect to 100 parts by mass of the toner particles from the viewpoint of charging stability. The content is more preferably 0.5 part by mass or more and 15.0 parts by mass or less, still more preferably 1.0 part by mass or more and 10.0 parts by mass of less.

In the case where the content of the external additive is less than 0.1 part by mass, when images each having a low print density are output in a large number for a long period of time under a severe environment such as a high-temperature and high-humidity environment, the stress applied to the toner cannot be suppressed, and the effect of durable stability is not easily obtained. In addition, in the case where the content of the external additive is more than 20.0 parts by mass, when images are output for a long period of time, there is a risk in that filming of external additive particles onto a carrier, a charging member, and a photosensitive member may occur.

[Toner Particle]

Next, the configuration of a toner particle to which the above-mentioned fine particle of the present disclosure is externally added is described in detail.

<Binder Resin>

A binder resin used in the toner of the present disclosure is not particularly limited, and the following polymers or resins may be used.

There are given, for example, homopolymers of styrene and substituted products thereof, such as polystyrene, poly-p-chlorostyrene, and polyvinyltoluene; styrene-based copolymers, such as a styrene-p-chlorostyrene copolymer, a styrene-vinyltoluene copolymer, a styrene-vinylnaphthalene copolymer, a styrene-acrylic acid ester copolymer, a styrene-methacrylic acid ester copolymer, a styrene-α-chloromethyl methacrylate copolymer, a styrene-acrylonitrile copolymer, a styrene-vinyl methyl ether copolymer, a styrene-vinyl ethyl ether copolymer, a styrene-vinyl methyl ketone copolymer, and a styrene-acrylonitrile-indene copolymer; and polyvinyl chloride, a phenol resin, a natural resin-modified phenol resin, a natural resin-modified maleic acid resin, an acrylic resin, a methacrylic resin, polyvinyl acetate, a silicone resin, a polyester resin, a polyurethane resin, a polyamide resin, a furan resin, an epoxy resin, a xylene resin, polyvinyl butyral, a terpene resin, a coumarone-indene resin, and a petroleum resin. Of those, polyester resin is preferable from the viewpoint of durable stability and charging stability.

In addition, the acid value of a polyester resin is preferably 0.5 mgKOH/g or more and 40 mgKOH/g or less from the viewpoints of the environmental stability and the charging stability. The acid value in the polyester resin and Si—$CH_3$ in the fine particle interact with each other. Thus, the durability and the chargeability of the toner under the high-temperature and high-humidity environment can be further improved. The acid value is more preferably 1 mgKOH/g or more and 20 mgKOH/g or less, still more preferably 1 mgKOH/g or more and 15 mgKOH/g or less.

<Colorant>

A colorant may be used as required in the toner of the present disclosure. Examples of the colorant include the following.

As a black colorant, there are given, for example: carbon black: and a colorant toned to a black color with a yellow colorant, a magenta colorant, and a cyan colorant. Although a pigment may be used alone as the colorant, a dye and the pigment are more preferably used in combination to improve the clarity of the colorant in terms of the quality of a full-color image.

As a pigment for magenta toner, there are given, for example: C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, or 282; C.I. Pigment Violet 19; and C.I. Vat Red 1, 2, 10, 13, 15, 23, 29, or 35.

As a dye for a magenta toner, there are given, for example: oil-soluble dyes, such as: C.I. Solvent Red 1, 3, 8, 23, 24, 25, 27, 30, 49, 81, 82, 83, 84, 100, 109, or 121; C.I. Disperse Red 9; C.I. Solvent Violet 8, 13, 14, 21, or 27; and C.I. Disperse Violet 1; and basic dyes, such as: C.I. Basic Red 1, 2, 9, 12, 13, 14, 15, 17, 18, 22, 23, 24, 27, 29, 32, 34, 35, 36, 37, 38, 39, or 40: and C.I. Basic Violet 1, 3, 7, 10, 14, 15, 21, 25, 26, 27, or 28.

As a pigment for a cyan toner, there are given, for example C.I. Pigment Blue 2, 3, 15:2, 15:3, 15:4, 16, or 17; C.I. Vat Blue 6: C.I. Acid Blue 45; and a copper phthalocyanine pigment in which a phthalocyanine skeleton is substituted by 1 to 5 phthalimidomethyl groups.

As a dye for a cyan toner, for example, C.I. Solvent Blue 70 is given.

As a pigment for a yellow toner, there are given, for example: C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, or 185; and C.I. Vat Yellow 1, 3, or 20.

As a dye for a yellow toner, for example, C.I. Solvent Yellow 162 is given.

The content of the colorant is preferably 0.1 part by mass or more and 30.0 parts by mass or less with respect to 100 parts by mass of the binder resin.

<Wax>

A wax may be used as required in the toner of the present disclosure. Examples of the wax include the following.

Hydrocarbon-based waxes, such as microcrystalline wax, paraffin wax, and Fischer-Tropsch wax, oxidized products of hydrocarbon-based waxes such as oxidized polyethylene wax, or block copolymers thereof; waxes each containing a fatty acid ester as a main component, such as caranuba wax; and waxes obtained by partially or wholly deacidifying fatty acid esters, such as deacidified carnauba wax.

Further, the examples include the following: saturated linear fatty acids, such as palmitic acid, stearic acid, and montanic acid, unsaturated fatty acids, such as brassidic acid, eleostearic acid, and parinaric acid, saturated alcohols, such as stearyl alcohol, aralkyl alcohol, behenyl alcohol, carnaubyl alcohol, ceryl alcohol, and melissyl alcohol; polyhydric alcohols such as sorbitol; esters of fatty acids, such as palmitic acid, stearic acid, behenic acid, and montanic acid, and alcohols, such as stearyl alcohol, aralkyl alcohol, behenyl alcohol, carnaubyl alcohol, ceryl alcohol, and melissyl alcohol: fatty acid amides, such as linoleamide, oleamide, and lauramide; saturated fatty acid bisamides, such as methylene bis stearamide, ethylene bis capramide, ethylene bis lauramide, and hexamethylene bis stearamide; unsaturated fatty acid amides, such as ethylene bis oleamide, hexamethylene bis oleamide, N,N'-dioleyladipamide, and N,N'-dioleylsebacamide; aromatic bisamides, such as m-xylenebisstearamide and N,N'-distearylisophthalamide: fatty acid metal salts (generally called metal soaps), such as calcium stearate, calcium laurate, zinc stearate, and magnesium stearate; waxes each obtained by grafting a vinyl-based monomer, such as styrene or acrylic acid, to an aliphatic hydrocarbon-based wax: partially esterified products of fatty acids and polyhydric alcohols, such as behenic acid monoglyceride; and methyl ester compounds each having a hydroxy group obtained by hydrogenation of a plant oil and fat.

The content of the wax is preferably 2.0 parts by mass or more and 30.0 parts by mass or less with respect to 100 parts by mass of the binder resin.

<Charge Control Agent>

A charge control agent may be incorporated into the toner of the present disclosure as required. Although a known charge control agent may be utilized as the charge control agent to be incorporated into the toner, a metal compound of an aromatic carboxylic acid is particularly preferred because the compound is colorless, increases the charging speed of the toner, and can stably hold a constant charge quantity.

As a negative charge control agent, there are given, for example: a salicylic acid metal compound; a naphthoic acid metal compound; a dicarboxylic acid metal compound; a polymer-type compound having a sulfonic acid or a carboxylic acid in a side chain thereof; a polymer-type compound having a sulfonate or a sulfonic acid esterified product in a side chain thereof; a polymer-type compound having a carboxylate or a carboxylic acid esterified product in a side chain thereof; a boron compound; a urea compound; a silicon compound; and a calixarene. The negative charge control agent may be internally or externally added to the toner particles.

The addition amount of the charge control agent is preferably 0.2 part by mass or more and 10.0 parts by mass or less with respect to 100 parts by mass of the binder resin.

<Inorganic Fine Powder>

In the toner of the present disclosure, in addition to the above-mentioned external additive for toner, another inorganic fine powder may be used in combination as required. The inorganic fine powder may be internally added to the toner particle or may be mixed with the toner particle as an external additive. The external additive is preferably inorganic fine powder such as silica. The inorganic fine powder is preferably hydrophobized with a hydrophobizing agent such as a silane compound, silicone oil, or a mixture thereof.

As an external additive for improving the flowability, inorganic fine powder having a specific surface area of 50 $m^2/g$ or more and 400 $m^2/g$ or less is preferred. An inorganic fine particle having a specific surface area in the above-mentioned range may be used in combination in order to achieve both the improvement of the flowability and the stabilization of the durability.

The inorganic fine powder is preferably used in an amount of 0.1 part by mass or more and 10.0 parts by mass or less with respect to 100 parts by mass of the toner particle. When the above-mentioned range is satisfied, the effect of the durable stability is easily obtained.

<Developer>

The toner of the present disclosure, which may be used as a one-component developer, is preferably used as a two-component developer by being mixed with a magnetic carrier for further improving its dot reproducibility because a stable image can be obtained for a long period of time.

Generally known carriers may be used as the magnetic carrier, and examples of the magnetic carrier include: surface-oxidized iron powder or unoxidized iron powder; particles of metals, such as iron, lithium, calcium, magnesium, nickel, copper, zinc, cobalt, manganese, chromium and rare earths, and particles made of alloys thereof or particles made of oxides thereof; a magnetic material such as ferrite; and a magnetic material-dispersed resin carrier (so-called resin carrier) containing a magnetic material and a binder resin holding the magnetic material under a state in which the magnetic material is dispersed therein.

When the toner is mixed with the magnetic carrier to be used as a two-component developer, satisfactory results are usually obtained by setting the carrier mixing ratio at that time, as a toner concentration in the two-component developer, to preferably 2 mass % or more and 15 mass % or less, more preferably 4 mass % or more and 13 mass % or less.

Method of Producing Toner Particle and Method of Producing Toner

A method of producing the toner particle is not particularly limited, and a conventionally known production method, such as a suspension polymerization method, an emulsion aggregation method, a melt-kneading method, or a dissolution suspension method, may be adopted.

The toner may be obtained by mixing the resultant toner particle with the external additive fine particle according to the present disclosure, and as required, any other external additive. The mixing of the toner particle with the external additive fine particle according to the present disclosure and the other external additive may be performed with a mixing apparatus, such as a double cone mixer, a V-type mixer, a drum-type mixer, a super mixer, a Henschel mixer, a Nauta mixer, and MECHANO HYBRID (manufactured by Nippon Coke & Engineering Co., Ltd.), or NOBILTA (manufactured by Hosokawa Micron Corporation).

Methods of Measuring Various Physical Properties

Methods of measuring various physical properties are described below.

Separation of Fine Particle and Toner Particle from Toner

The respective physical properties may also be measured through use of fine particles separated from a toner by the following methods.

About 30 mL of an electrolyte aqueous solution is loaded into a 100 mL flat-bottom beaker made of glass. 6 mL of "Contaminon N" (a 10 mass % aqueous solution of a neutral detergent for washing a precision measuring device formed of a nonionic surfactant, an anionic surfactant, and an organic builder and having a pH of 7, manufactured by Wako Pure Chemical Industries, Ltd.) is added as a dispersant to the electrolyte aqueous solution. Thus, a dispersion liquid is produced. 1 g of a toner is added to the dispersion liquid, and toner clumps are loosened with a spatula or the like. A predetermined amount of ion-exchanged water is loaded into a water tank of an ultrasonic disperser "Ultrasonic Dispersion System Tetora 150" (manufactured by Nikkaki Bios Co., Ltd.) having an electrical output of 120 W in which two oscillators each having an oscillatory frequency of 50 kHz are built so as to be out of phase by 180°. About 2 ml of the Contaminon N is added to the water tank. The beaker containing the dispersion liquid having the toner added thereto is set on the ultrasonic disperser, and the ultrasonic disperser is operated to separate fine particles from the toner. Next, a diaphragm type dry vacuum pump DTC-41 (manufactured by ULVAC, Inc.) is connected to a Kiriyama funnel and a suction bottle, and the toner particles and the fine particles are separated by filtration with a paper filter No. 5C for a Kiriyama funnel. The recovered dispersion liquid in which the fine particles are dispersed is subjected to a centrifugal separator to precipitate the fine particles, and the fine particles are collected. As required, the centrifugation is repeated to perform separation sufficiently, and then the fine particles are collected and dried to provide fine particles.

When a plurality of external additives are added, the external additive of the present disclosure may be selected by adjusting the number of revolutions of the centrifugation and performing fractionation.

Method of Measuring Number-Average Particle Diameter $D_A$ of Primary Particle of External Additive The number-average particle diameter $D_A$ of the primary particle of the external additive may be determined by measurement using a centrifugal sedimentation method. Specifically, 0.01 g of dried external additive particles are loaded into a 25 mL glass vial, and 0.2 g of a 5% Triton solution and 19.8 g of RO water are added to the vial, to thereby prepare a solution. Next, a probe (tip end in a tip end) of an ultrasonic disperser is immersed in the solution, and ultrasonic dispersion is performed at an output power of 20 W for 15 minutes, to thereby provide a dispersion liquid. Subsequently, the number-average particle diameter of the primary particle is measured by a centrifugal sedimentation particle size distribution measuring device DC24000 of CPS Instruments, Inc. through use of the dispersion liquid. The number of revolutions of a disc is set to 18,000 rpm, and a true density is set to 1.3 g/cm$^3$. Before the measurement, the device is calibrated through use of polyvinyl chloride particles having an average particle diameter of 0.476 μm.

Method of Measuring Young's Modulus of External Additive

The Young's modulus of the external additive is determined by a microcompression test using Hysitron PI 85 L Picoindenter (manufactured by Bruker Corporation).

The Young's modulus (MPa) is calculated from the slope of a profile (load displacement curve) of a displacement (nm) and a test force (μN) obtained by measurement.

Device

Base system: Hysitron PI 85 L

Measurement indenter: circular flat-end indenter having a diameter of 1 μm

Used SEM: Thermo Fisher Versa 3D

SEM conditions: −10° tilt, 13 pA at 10 keV

Measurement Conditions

Measurement mode: displacement control

Maximum displacement: 30 nm

Displacement rate: 1 nm/sec

Retention time: 2 sec

Unloading rate: 5 nm/sec

Analysis Method

The Hertz analysis is applied to a curve obtained at the time of compression by from 0 nm to 10 nm in the resultant load displacement curve, to thereby calculate the Young's modulus of the fine particles.

Sample Preparation

Fine Particles Adhering to a Silicon Wafer

Methods of Measuring of Average Height H and Average Maximum Diameter $D_B$ of Convex Portions Derived from Convex Forming Particles B Measurement of the average height H and the average maximum diameter $D_B$ of the convex portions derived from the convex forming particles B is performed through use of a scanning electron microscope "S-4800" (product name; manufactured by Hitachi, Ltd.). In a field of view in which the external additive was magnified by 200,000 times, convex portions were observed at 200 sites at random. The maximum diameters of the respective convex portions derived from the convex forming particles were measured, and the average maximum diameter $D_B$ was calculated from an average of the measured values. In addition, the convex portions at 200 sites were tilted at the time of observation and adjusted to an angle at which the height of each of the convex portions was able to be measured. The heights of the respective convex portions were measured, and the average height H was calculated from an average of the measured values.

Method of Measuring True Specific Gravity of External Additive

The true specific gravity of the external additive was measured by a dry automatic densitometer Autopycnometer (manufactured by Yuasa Ionics). The conditions are as described below.

Cell: SM Cell (10 mL)

Sample amount: 0.05 g

This measurement method involves measuring the true specific gravity of each of a solid and a liquid based on a gas phase substitution method. In the same manner as in a liquid phase substitution method, the gas phase substitution method is based on Archimedes' principle, but has high precision with respect to micropores because a gas (argon gas) is used as a substitution medium.

Method of Measuring Surface Treatment Agent of External Additive

A surface treatment agent for the external additive is analyzed by pyrolysis gas chromatography mass spectrometry (GC-MS).

Measurement conditions are specifically as described below.

Device: GC6890A (manufactured by Agilent Technologies), pyrolyzer (manufactured by Japan Analytical Industry Co., Ltd.)

Column: HP-5 ms 30 m

Pyrolysis temperature: 590° C.

The surface treatment agent for the external additive is identified by identifying each peak position in a profile obtained by measurement through use of a standard sample.

Method of Measuring Acid Value of Binder Resin

The term "acid value" refers to the number of milligrams of potassium hydroxide required for the neutralization of an acid component such as a free fatty acid and a resin acid contained in 1 g of a sample. The acid value is measured in conformity with JIS K 0070-1992, in accordance with the following procedure.

(1) Preparation of Reagents

In 90 mL of ethyl alcohol (95 vol %), 1.0 g of phenolphthalein is dissolved, and ion-exchanged water is added to make 100 mL to provide a phenolphthalein solution.

In 5 mL of water, 7 g of special-grade potassium hydroxide is dissolved, and ethyl alcohol (95 vol %) is added to make 1 L. The resultant is placed in an alkali-resistant container so as not to be brought into contact with a carbon dioxide gas or the like, and is left to stand therein for 3 days, followed by filtration to provide a potassium hydroxide solution. The resultant potassium hydroxide solution is stored in an alkali-resistant container. The factor of the potassium hydroxide solution is determined from the amount of the potassium hydroxide solution required for neutralization when 25 mL of 0.1 mol/L hydrochloric acid is taken in an Erlenmeyer flask and a few drops of the phenolphthalein solution are added, followed by titration with the potassium hydroxide solution. The 0.1 mol/L hydrochloric acid to be used is produced in conformity with JIS K 8001-1998.

(2) Operations (A) Main Test

In a 200 mL Erlenmeyer flask, 2.0 g of the pulverized sample is precisely weighed and is dissolved by adding 100 mL of a mixed solution of toluene/ethanol (2:1) over 5 hours. Then, a few drops of the phenolphthalein solution are added as an indicator, and titration is performed with the potassium hydroxide solution. The endpoint of the titration is defined as the point where a pale pink color of the indicator persists for about 30 seconds.

(B) Blank Test

Titration is performed in the same manner as in the above-mentioned operation except that no sample is used (that is, only the mixed solution of toluene/ethanol (2:1) is used).

(3) The Acid Value is Calculated by Substituting the Obtained Results into the Following Equation:

$$A=[(C-B)\times f\times 5.61]/S$$

where A represents the acid value (mgKOH/g), B represents the addition amount (mL) of the potassium hydroxide solution in the blank test, C represents the addition amount (mL) of the potassium hydroxide solution in the main test, "f" represents the factor of the potassium hydroxide solution, and S represents the mass (g) of the sample.

Measurement of Acid Value of Polyester Resin from Toner

The following method may be used as a method of measuring the acid value of a polyester resin from a toner. A polyester resin is separated from a toner and measured for an acid value by the following method.

A toner is dissolved in tetrahydrofuran (THF), and the solvent is evaporated under reduced pressure from the resultant soluble matter. Thus, a tetrahydrofuran (THF)-soluble component of the toner is obtained.

The resultant tetrahydrofuran (THF)-soluble component of the toner is dissolved in chloroform to prepare a sample solution having a concentration of 25 mg/mL.

3.5 ml of the resultant sample solution is injected into the following device, and a component having a molecular weight of 2,000 or more is fractionated as a resin component under the following conditions.

Preparative GPC device: Preparative HPLC Model LC-980, manufactured by Japan Analytical Industry Preparative column: JAIGEL 3H, JAIGEL 5H (manufactured by Japan Analytical Industry)

Eluent: chloroform

Flow rate: 3.5 mL/min

After the high-molecular-weight component derived from the resin is fractionated, the solvent is evaporated under reduced pressure. The resultant is further dried under reduced pressure in an atmosphere of 90° C. for 24 hours. The above-mentioned operation is repeated until about 2.0 g of the resin component is obtained. An acid value is measured in accordance with the above-mentioned procedure through use of the resultant sample.

Method of Measuring Weight-Average Particle Diameter (D4) of Toner Particle

The weight-average particle diameter (D4) of the toner particle is measured with the number of effective measurement channels of 25,000 by using a precision particle size distribution-measuring apparatus based on a pore electrical resistance method provided with a 100 μm aperture tube "Coulter Counter Multisizer 3" (trademark, manufactured by Beckman Coulter, Inc.) and dedicated software included therewith "Beckman Coulter Multisizer 3 Version 3.51" (manufactured by Beckman Coulter, Inc.) for setting measurement conditions and analyzing measurement data. Then, the measurement data is analyzed to calculate the diameter.

An electrolyte aqueous solution prepared by dissolving special-grade sodium chloride in ion-exchanged water so as to have a concentration of about 1 mass %, such as "ISOTON II" (manufactured by Beckman Coulter, Inc.), may be used in the measurement.

The dedicated software is set as described below prior to the measurement and the analysis.

In the "change standard measurement method (SOM)" screen of the dedicated software, the total count number of a control mode is set to 50,000 particles, the number of times of measurement is set to 1, and a value obtained by using "standard particles each having a particle diameter of 10.0 μm" (manufactured by Beckman Coulter, Inc.) is set as a Kd value. A threshold and a noise level are automatically set by pressing a threshold/noise level measurement button. In addition, a current is set to 1,600 pA, a gain is set to 2, and an electrolyte solution is set to ISOTON II, and a check mark is placed in a check box as to whether the aperture tube is flushed after the measurement.

In the "setting for conversion from pulse to particle diameter" screen of the dedicated software, a bin interval is set to a logarithmic particle diameter, the number of particle diameter bins is set to 256, and a particle diameter range is set to the range of 2 μm or more and 60 μm or less.

A specific measurement method is as described below.

(1) About 200 ml of the electrolyte aqueous solution is charged into a 250 mL round-bottom beaker made of glass dedicated for the Multisizer 3. The beaker is set in a sample stand, and the electrolyte aqueous solution in the beaker is stirred with a stirrer rod at 24 rotations/sec in a counterclockwise direction. Then, dirt and bubbles in the aperture tube are removed by the "aperture tube flush" function of the dedicated software.

(2) About 30 mL of the electrolyte aqueous solution is charged into a 100-mL flat-bottom beaker made of glass. About 0.3 mL of a diluted solution prepared by diluting "Contaminon N" (a 10 mass % aqueous solution of a neutral detergent for washing a precision measuring device formed of a nonionic surfactant, an anionic surfactant, and an organic builder and having a pH of 7 manufactured by Wako Pure Chemical Industries, Ltd.) with ion-exchanged water by three mass fold is added as a dispersant to the electrolyte aqueous solution.

(3) A predetermined amount of ion-exchanged water is charged into the water tank of an ultrasonic dispersing unit "Ultrasonic Dispersion System Tetora 150" (manufactured by Nikkaki Bios Co., Ltd.) having an electrical output of 120 W in which two oscillators each having an oscillatory frequency of 50 kHz are built so as to be out of phase by 180°. About 2 ml of the Contaminon N is charged into the water tank.

(4) The beaker in the section (2) is set in the beaker fixing hole of the ultrasonic dispersing unit, and the ultrasonic dispersing unit is operated. Then, the height position of the beaker is adjusted so that the resonance state of the liquid level of the electrolyte aqueous solution in the beaker is maximized.

(5) About 10 mg of toner is gradually added to and dispersed in the electrolyte aqueous solution in the beaker in the section (4) under a state in which the electrolyte aqueous solution is irradiated with the ultrasonic wave. Then, the ultrasonic dispersion treatment is continued for an additional 60 seconds. The temperature of water in the water tank is appropriately adjusted to 10° C. or more and 40° C. or less in the ultrasonic dispersion.

(6) The electrolyte aqueous solution in the section (5) in which the toner has been dispersed is dropped with a pipette to the round-bottom beaker in the section (1) placed in the sample stand, and the concentration of the toner to be measured is adjusted to about 5%. Then, measurement is performed until the particle diameters of 50,000 particles are measured.

(7) The measurement data is analyzed with the dedicated software included with the apparatus, and the weight-average particle diameter (D4) is calculated. An "average diameter" on the "analysis/volume statistics (arithmetic average)" screen of the dedicated software when the dedicated software is set to show a graph in a vol % unit is the weight-average particle diameter (D4).

EXAMPLES

The present disclosure is more specifically described with reference to Examples described below. However, the present disclosure is by no means limited to these Examples. The "part(s)" in the following formulations are all on a mass basis unless otherwise stated.

Production Example of Convex Forming Particle B-1 Dispersion Liquid

B-1. Hydrolysis and Polycondensation Steps:

(B-1) 21.6 g of RO water, 135.0 g of methanol, 0.004 g of acetic acid serving as a catalyst, and 12.2 g of dimethoxydimethylsilane were loaded into a 500 mL beaker and stirred at 45° C. for 5 minutes.

(B-2) 1.0 g of 28% ammonia water and 15.0 g of tetraethoxysilane were added to the resultant, followed by stirring at 30° C. for 3.5 hours. Thus, a raw material solution was obtained.

B-2. Particle Forming Step:

120.0 g of RO water was loaded into a 1,000 mL beaker, and the raw material solution obtained through "B-1. Hydrolysis and Polycondensation Steps" described above was added dropwise over 5 minutes to the water under stirring at 25° C. After that, the mixed liquid was increased in temperature to 60° C. and stirred for 1.5 hours while the temperature was kept at 60° C. Thus, a convex forming particle B-1 dispersion liquid was obtained.

Production Example of Convex Forming Particle B-2 Dispersion Liquid

A convex forming particle B-2 dispersion liquid was obtained in the same manner as in the production example of the convex forming particle B-1 dispersion liquid except that 25.3 g of trimethoxymethylsilane was added without adding dimethoxydimethylsilane in (B-1) of the hydrolysis and polycondensation steps described above, and the amount of tetraethoxysilane was changed to 1.9 g in (B-2) thereof.

Production Example of Convex Forming Particle B-3 Dispersion Liquid

A convex forming particle B-3 dispersion liquid was obtained in the same manner as in the production example of the convex forming particle B-1 dispersion liquid except that the stirring time was changed to 4.0 hours in (B-2) of the hydrolysis and polycondensation steps described above.

Production Example of Convex Forming Particle B-4 Dispersion Liquid

A convex forming particle B-4 dispersion liquid was obtained in the same manner as in the production example of the convex forming particle B-1 dispersion liquid except that the amount of 28% ammonia water was changed to 2.0 g and the stirring temperature was changed to 35° C. in (B-2) of the hydrolysis and polycondensation steps described above.

Production Example of Convex Forming Particle B-5 Dispersion Liquid

A convex forming particle B-5 dispersion liquid was obtained in the same manner as in the production example of the convex forming particle B-1 dispersion liquid except that the stirring temperature was changed to 35° C. in (B-2) of the hydrolysis and polycondensation steps described above.

Production Example of Convex Forming Particle B-6 Dispersion Liquid

A convex forming particle B-6 dispersion liquid was obtained in the same manner as in the production example of the convex forming particle B-1 dispersion liquid except that the stirring time was changed to 3.0 hours in (B-2) of the hydrolysis and polycondensation steps described above.

Production Example of Convex Forming Particle B-7 Dispersion Liquid

A convex forming particle B-7 dispersion liquid was obtained in the same manner as in the production example of the convex forming particle B-1 dispersion liquid except that the stirring temperature was changed to 45° C. in (B-2) of the hydrolysis and polycondensation steps described above.

Production Example of Convex Forming Particle B-8 Dispersion Liquid

A convex forming particle B-8 dispersion liquid was obtained in the same manner as in the production example of the convex forming particle B-1 dispersion liquid except that the stirring temperature was changed to 35° C. and the stirring time was changed to 4.0 hours in (B-2) of the hydrolysis and polycondensation steps described above.

Production Example of Convex Forming Particle B-9 Dispersion Liquid

A convex forming particle B-9 dispersion liquid was obtained in the same manner as in the production example of the convex forming particle B-1 dispersion liquid except that 8.2 g of trimethoxymethylsilane was added without adding dimethoxydimethylsilane in (B-1) of the hydrolysis and polycondensation steps described above, and the amount of tetraethoxysilane was changed to 19.0 g in (B-2) thereof.

Production Example of Convex Forming Particle B-10 Dispersion Liquid

A convex forming particle B-10 dispersion liquid was obtained in the same manner as in the production example of the convex forming particle B-1 dispersion liquid except that the stirring temperature was changed to 45° C. and the stirring time was changed to 4.0 hours in (B-2) of the hydrolysis and polycondensation steps described above.

Production Example of Convex Forming Particle B-11 Dispersion Liquid

A convex forming particle B-11 dispersion liquid was obtained in the same manner as in the production example of the convex forming particle B-1 dispersion liquid except that the amount of 28% ammonia water was changed to 2.0 g, the stirring temperature was changed to 35° C., and the stirring time was changed to 3.0 hours in (B-2) of the hydrolysis and polycondensation steps described above.

Production Example of Convex Forming Particle B-12 Dispersion Liquid

A convex forming particle B-12 dispersion liquid was obtained in the same manner as in the production example of the convex forming particle B-1 dispersion liquid except that the amount of dimethoxydimethylsilane was changed to 5.4 g in (B-1) of the hydrolysis and polycondensation steps described above, and 21.8 g of trimethoxymethylsilane was added without adding tetraethoxysilane in (B-2) thereof.

Production Example of Convex Forming Particle B-13 Dispersion Liquid

A convex forming particle B-13 dispersion liquid was obtained in the same manner as in the production example of the convex forming particle B-1 dispersion liquid except that 5.4 g of trimethoxymethylsilane was added without adding dimethoxydimethylsilane in (B-1) of the hydrolysis and polycondensation steps described above, and the amount of tetraethoxysilane was changed to 21.8 g in (B-2) thereof.

Production Example of External Additive 1 for Toner

1. Hydrolysis and Polycondensation Steps:
   (1) 21.6 g of RO water, 135.0 g of methanol, 0.004 g of acetic acid serving as a catalyst, and 12.2 g of dimethoxydimethylsilane were loaded into a 500 mL beaker and stirred at 45° C. for 5 minutes.
   (2) 2.0 g of 28% ammonia water and 15.0 g of tetraethoxysilane were added to the resultant, followed by stirring at 35° C. for 3.5 hours. Thus, a raw material solution was obtained.
2. Particle Forming Step:
   120.0 g of RO water was loaded into a 1,000 mL beaker, and the raw material solution obtained through the hydrolysis and polycondensation steps described above was added dropwise over 5 minutes into the water under stirring at 25° C. After that, the mixed liquid was increased in temperature to 60° C. and stirred for 0.5 hour while the temperature was kept at 60° C. Then, 180 g of the convex forming particle B-1 dispersion liquid was added dropwise into the resultant, followed by further stirring for 1.0 hour. Thus, a dispersion liquid of external additive fine particles was obtained.
3. Hydrophobizing Step:
   6.0 g of hexamethyldisilazane was added as a hydrophobizing agent to the dispersion liquid of the external additive fine particles obtained through the particle forming step described above, and the mixture was stirred at 60° C. for 3.0 hours. After the resultant was left to stand still for 5 minutes, powder precipitated in a lower part of the solution was recovered by suction filtration and dried under reduced pressure at 120° C. for 24 hours, to thereby provide an external additive 1 for toner. The number-average particle diameter of the primary particles of the external additive 1 for toner was 0.12 μm.

Production Example of External Additive 2 for Toner

An external additive 2 for toner was obtained in the same manner as in the production example of the external additive 1 for toner except that the amount of dimethoxydimethylsilane was changed to 5.4 g in (1) of the hydrolysis and polycondensation steps described above, and the amount of tetraethoxysilane was changed to 8.2 g and 13.6 g of trimethoxymethylsilane was added in (2) thereof.

Production Example of External Additive 3 for Toner

An external additive 3 for toner was obtained in the same manner as in the production example of the external additive 1 for toner except that 25.3 g of trimethoxymethylsilane was added without adding dimethoxydimethylsilane in (1) of the hydrolysis and polycondensation steps described above, the amount of tetraethoxysilane was changed to 1.9 g in (2) thereof, and the convex forming particle B-1 dispersion liquid to be added dropwise was changed to the convex forming particle B-2 dispersion liquid in the particle forming step described above.

Production Example of External Additive 4 for Toner

An external additive 4 for toner was obtained in the same manner as in the production example of the external additive 1 for toner except that the convex forming particle B-1 dispersion liquid to be added dropwise was changed to the convex forming particle B-3 dispersion liquid in the particle forming step described above.

Production Example of External Additive 5 for Toner

An external additive 5 for toner was obtained in the same manner as in the production example of the external additive 1 for toner except that the convex forming particle B-1 dispersion liquid to be added dropwise was changed to the convex forming particle B-4 dispersion liquid in the particle forming step described above.

Production Example of External Additive 6 for Toner

An external additive 6 for toner was obtained in the same manner as in the production example of the external additive 1 for toner except that the convex forming particle B-1 dispersion liquid to be added dropwise was changed to the convex forming particle B-5 dispersion liquid in the particle forming step described above.

Production Example of External Additive 7 for Toner

An external additive 7 for toner was obtained in the same manner as in the production example of the external additive 1 for toner except that the time at which the convex forming particles were added dropwise was changed to the time after stirring for 0.75 hour, the convex forming particle B-1 dispersion liquid to be added dropwise was changed to the convex forming particle B-5 dispersion liquid, and the stirring time after dropwise addition was changed to 0.75 hour in the particle forming step described above.

Production Example of External Additive 8 for Toner

An external additive 8 for toner was obtained in the same manner as in the production example of the external additive 1 for toner except that the time at which the convex forming particles were added dropwise was changed to the time after stirring for 0.75 hour, the convex forming particle B-1 dispersion liquid to be added dropwise was changed to the convex forming particle B-6 dispersion liquid, and the stirring time after dropwise addition was changed to 0.75 hour in the particle forming step described above.

Production Example of External Additive 9 for Toner

An external additive 9 for toner was obtained in the same manner as in the production example of the external additive 1 for toner except that the amount of 28% ammonia water was changed to 3.0 g and the stirring temperature was changed to 25° C. in (2) of the hydrolysis and polycondensation steps described above, and the convex forming particle B-1 dispersion liquid to be added dropwise was changed to the convex forming particle B-4 dispersion liquid in the particle forming step described above.

Production Example of External Additive 10 for Toner

An external additive 10 for toner was obtained in the same manner as in the production example of the external additive 1 for toner except that the amount of 28% ammonia water was changed to 1.0 g and the stirring temperature was changed to 40° C. in (2) of the hydrolysis and polycondensation steps described above, and the convex forming particle B-1 dispersion liquid to be added dropwise was changed to the convex forming particle B-7 dispersion liquid in the particle forming step described above.

Production Example of External Additive 11 for Toner

An external additive 11 for toner was obtained in the same manner as in the production example of the external additive 1 for toner except that the amount of 28% ammonia water was changed to 3.0 g and the stirring temperature was changed to 35° C. in (2) of the hydrolysis and polycondensation steps described above, and the convex forming particle B-1 dispersion liquid to be added dropwise was changed to the convex forming particle B-4 dispersion liquid in the particle forming step described above.

Production Example of External Additive 12 for Toner

An external additive 12 for toner was obtained in the same manner as in the production example of the external additive 1 for toner except that the amount of 28% ammonia water was changed to 1.0 g and the stirring temperature was changed to 30° C. in (2) of the hydrolysis and polycondensation steps described above, and the convex forming particle B-1 dispersion liquid to be added dropwise was changed to the convex forming particle B-8 dispersion liquid in the particle forming step described above.

Production Example of External Additive 13 for Toner

An external additive 13 for toner was obtained in the same manner as in the production example of the external additive 1 for toner except that the convex forming particle B-1 dispersion liquid to be added dropwise was changed to the convex forming particle B-9 dispersion liquid in the particle forming step described above.

Production Example of External Additive 14 for Toner

An external additive 14 for toner was obtained in the same manner as in the production example of the external additive 1 for toner except that the amount of dimethoxydimethylsilane was changed to 2.7 g in (1) of the hydrolysis and polycondensation steps described above, and 24.5 g of trimethoxymethylsilane was added without adding tetraethoxysilane in (2) thereof.

Production Example of External Additive 15 for Toner

An external additive 15 for toner was obtained in the same manner as in the production example of the external additive 1 for toner except that 8.2 g of trimethoxymethylsilane was added without adding dimethoxydimethylsilane in (1) of the hydrolysis and polycondensation steps described above, the amount of tetraethoxysilane was changed to 19.0 g in (2) thereof, and the convex forming particle B-1 dispersion liquid to be added dropwise was changed to the convex forming particle B-9 dispersion liquid in the particle forming step described above.

Production Example of External Additive 16 for Toner

An external additive 16 for toner was obtained in the same manner as in the production example of the external additive 1 for toner except that the time at which the convex forming particles were added dropwise was changed to the time immediately after the temperature reached 60° C. and the stirring time after dropwise addition was changed to 1.5 hours in the particle forming step described above.

Production Example of External Additive 17 for Toner

An external additive 17 for toner was obtained in the same manner as in the production example of the external additive 1 for toner except that the time at which the convex forming particles were added dropwise was changed to the time after stirring for 1.0 hour and the stirring time after dropwise addition was changed to 0.5 hour in the particle forming step described above.

Production Example of External Additive 18 for Toner

An external additive 18 for toner was obtained in the same manner as in the production example of the external additive 1 for toner except that the amount of 28% ammonia water was changed to 1.0 g, the stirring temperature was changed to 45° C., and the stirring time was changed to 4.0 hours in (2) of the hydrolysis and polycondensation steps described above, and the convex forming particle B-1 dispersion liquid to be added dropwise was changed to the convex forming particle B-10 dispersion liquid in the particle forming step described above.

Production Example of External Additive 19 for Toner

An external additive 19 for toner was obtained in the same manner as in the production example of the external additive 1 for toner except that the amount of 28% ammonia water was changed to 5.0 g, the stirring temperature was changed to 25° C., and the stirring time was changed to 2.0 hours in (2) of the hydrolysis and polycondensation steps described above, and the convex forming particle B-1 dispersion liquid to be added dropwise was changed to the convex forming particle B-11 dispersion liquid in the particle forming step described above.

Production Example of External Additive 20 for Toner

An external additive 20 for toner was obtained in the same manner as in the production example of the external additive 1 for toner except that the amount of dimethoxydimethylsilane was changed to 5.4 g in (1) of the hydrolysis and polycondensation steps, 21.8 g of trimethoxymethylsilane was added without adding tetraethoxysilane in (2) thereof, and the convex forming particle B-1 dispersion liquid to be added dropwise was changed to the convex forming particle B-12 dispersion liquid in the particle forming step described above.

Production Example of External Additive 21 for Toner

An external additive 21 for toner was obtained in the same manner as in the production example of the external additive 1 for toner except that 5.4 g of trimethoxymethylsilane was added without adding dimethoxydimethylsilane in (1) of the hydrolysis and polycondensation steps described above, the amount of tetraethoxysilane was changed to 21.8 g in (2) thereof, and the convex forming particle B-1 dispersion liquid to be added dropwise was changed to the convex forming particle B-13 dispersion liquid in the particle forming step described above.

The physical properties of each of the external additives 1 to 21 for toner obtained above are shown in Table 1.

TABLE 1-1

| | Content ratio in base particle A | | | | | | Content ratio in convex forming particle B | | | | | |
|---|---|---|---|---|---|---|---|---|---|---|---|---|
| External additive for toner No. | Sum of content ratios of unit (a), unit (b) and unit (c) | Expression (I) | Expression (II) | Expression (III) | Base particle A Young's modulus (GPa) | Convex forming particle B | Sum of content ratios of unit (a), unit (b) and unit (c) | Expression (I) | Expression (II) | Expression (III) | Particle B Young's modulus (GPa) | Particle B particle diameter $D_9$ (μm) |
| 1 | 100% | 0.55 | 0.00 | 0.45 | 15 | B-1 | 100% | 0.55 | 0.00 | 0.45 | 15 | 0.050 |
| 2 | 100% | 0.30 | 0.50 | 0.20 | 15 | B-1 | 100% | 0.55 | 0.00 | 0.45 | 15 | 0.050 |
| 3 | 100% | 0.07 | 0.93 | 0.00 | 15 | B-2 | 100% | 0.07 | 0.93 | 0.00 | 15 | 0.050 |
| 4 | 100% | 0.55 | 0.00 | 0.45 | 15 | B-3 | 100% | 0.55 | 0.00 | 0.45 | 15 | 0.045 |
| 5 | 100% | 0.55 | 0.00 | 0.45 | 15 | B-4 | 100% | 0.55 | 0.00 | 0.45 | 15 | 0.080 |
| 6 | 100% | 0.55 | 0.00 | 0.45 | 15 | B-5 | 100% | 0.55 | 0.00 | 0.45 | 15 | 0.040 |
| 7 | 100% | 0.55 | 0.00 | 0.45 | 15 | B-5 | 100% | 0.55 | 0.00 | 0.45 | 15 | 0.040 |
| 8 | 100% | 0.55 | 0.00 | 0.45 | 15 | B-6 | 100% | 0.55 | 0.00 | 0.45 | 15 | 0.060 |
| 9 | 100% | 0.55 | 0.00 | 0.45 | 15 | B-4 | 100% | 0.55 | 0.00 | 0.45 | 15 | 0.080 |
| 10 | 100% | 0.55 | 0.00 | 0.45 | 15 | B-7 | 100% | 0.55 | 0.00 | 0.45 | 15 | 0.015 |
| 11 | 100% | 0.55 | 0.00 | 0.45 | 15 | B-4 | 100% | 0.55 | 0.00 | 0.45 | 15 | 0.080 |
| 12 | 100% | 0.55 | 0.00 | 0.45 | 15 | B-8 | 100% | 0.55 | 0.00 | 0.45 | 15 | 0.030 |
| 13 | 100% | 0.55 | 0.00 | 0.45 | 15 | B-9 | 100% | 0.70 | 0.30 | 0.00 | 30 | 0.050 |
| 14 | 100% | 0.00 | 0.90 | 0.10 | 11 | B-1 | 100% | 0.55 | 0.00 | 0.45 | 15 | 0.050 |
| 15 | 100% | 0.70 | 0.30 | 0.00 | 30 | B-9 | 100% | 0.70 | 0.30 | 0.00 | 30 | 0.050 |
| 16 | 100% | 0.55 | 0.00 | 0.45 | 15 | B-1 | 100% | 0.55 | 0.00 | 0.45 | 15 | 0.050 |
| 17 | 100% | 0.55 | 0.00 | 0.45 | 15 | B-1 | 100% | 0.55 | 0.00 | 0.45 | 15 | 0.050 |
| 18 | 100% | 0.55 | 0.00 | 0.45 | 15 | B-10 | 100% | 0.55 | 0.00 | 0.45 | 15 | 0.010 |
| 19 | 100% | 0.55 | 0.00 | 0.45 | 15 | B-11 | 100% | 0.55 | 0.00 | 0.45 | 15 | 0.100 |
| 20 | 100% | 0.00 | 0.80 | 0.20 | 9 | B-12 | 100% | 0.00 | 0.80 | 0.20 | 9 | 0.050 |
| 21 | 100% | 0.80 | 0.20 | 0.00 | 32 | B-13 | 100% | 0.80 | 0.20 | 0.00 | 32 | 0.050 |

TABLE 1-2

| External additive for toner No. | Particle diameter $D_A$ (μm) | Young's modulus (GPa) | True specific gravity (g/cm$^3$) | Surface treatment hydrophobizing agent | Convex forming particle B | $H/D_A$ | $H/D_B$ |
|---|---|---|---|---|---|---|---|
| 1 | 0.12 | 15 | 1.30 | Hexamethyldisilazane | B-1 | 0.17 | 0.41 |
| 2 | 0.12 | 15 | 1.30 | Hexamethyldisilazane | B-1 | 0.17 | 0.41 |
| 3 | 0.12 | 15 | 1.30 | Hexamethyldisilazane | B-2 | 0.17 | 0.41 |
| 4 | 0.12 | 15 | 1.30 | Hexamethyldisilazane | B-3 | 0.15 | 0.41 |
| 5 | 0.16 | 15 | 1.30 | Hexamethyldisilazane | B-4 | 0.25 | 0.50 |
| 6 | 0.12 | 15 | 1.30 | Hexamethyldisilazane | B-5 | 0.10 | 0.33 |
| 7 | 0.12 | 15 | 1.30 | Hexamethyldisilazane | B-5 | 0.18 | 0.55 |
| 8 | 0.12 | 15 | 1.30 | Hexamethyldisilazane | B-6 | 0.35 | 0.60 |
| 9 | 0.30 | 15 | 1.30 | Hexamethyldisilazane | B-4 | 0.11 | 0.41 |
| 10 | 0.03 | 15 | 1.30 | Hexamethyldisilazane | B-7 | 0.20 | 0.41 |
| 11 | 0.20 | 15 | 1.30 | Hexamethyldisilazane | B-4 | 0.16 | 0.41 |
| 12 | 0.07 | 15 | 1.30 | Hexamethyldisilazane | B-8 | 0.17 | 0.41 |
| 13 | 0.12 | 15 | 1.30 | Hexamethyldisilazane | B-9 | 0.17 | 0.41 |
| 14 | 0.12 | 11 | 1.30 | Hexamethyldisilazane | B-1 | 0.17 | 0.41 |
| 15 | 0.12 | 30 | 1.30 | Hexamethyldisilazane | B-9 | 0.17 | 0.41 |
| 16 | 0.12 | 15 | 1.30 | Hexamethyldisilazane | B-1 | 0.06 | 0.21 |
| 17 | 0.12 | 15 | 1.30 | Hexamethyldisilazane | B-1 | 0.35 | 0.85 |
| 18 | 0.02 | 15 | 1.30 | Hexamethyldisilazane | B-10 | 0.25 | 0.50 |
| 19 | 0.33 | 15 | 1.30 | Hexamethyldisilazane | B-11 | 0.12 | 0.41 |
| 20 | 0.12 | 9 | 1.30 | Hexamethyldisilazane | B-12 | 0.17 | 0.41 |
| 21 | 0.12 | 32 | 1.30 | Hexamethyldisilazane | B-13 | 0.17 | 0.41 |

Production Example of Polyester Resin A1

| | |
|---|---|
| Polyoxypropylene(2.2)-2,2-bis(4-hydroxyphenyl)propane | 76.9 parts (0.167 part by mole) |
| Terephthalic acid (TPA) | 25.0 parts (0.145 part by mole) |
| Adipic acid | 8.0 parts (0.054 part by mole) |
| Titanium tetrabutoxide | 0.5 part |

The above-mentioned materials were loaded into a four-necked 4-liter flask made of glass, and a temperature gauge, a stirring rod, a capacitor, and a nitrogen introduction tube were mounted on the flask. The resultant flask was placed in a mantle heater. Next, the inside of the flask was purged with a nitrogen gas, and then the temperature was gradually increased under stirring. The materials were subjected to a reaction for 4 hours under stirring at a temperature of 200° C. (first reaction step). After that, 1.2 parts (0.006 part by mole) of trimellitic anhydride (TMA) was added to the resultant, and the mixture was subjected to a reaction at 180° C. for 1 hour (second reaction step), to thereby provide a polyester resin A1 as a binder resin component. The polyester resin A1 had an acid value of 5 mgKOH/g.

Production Example of Polyester Resin A2

| | |
|---|---|
| Polyoxypropylene(2.2)-2,2-bis(4-hydroxyphenyl)propane | 71.3 parts (0.155 part by mole) |
| Terephthalic acid | 24.1 parts (0.145 part by mole) |
| Titanium tetrabutoxide | 0.6 part |

The above-mentioned materials were loaded into a four-necked 4-liter flask made of glass, and a temperature gauge, a stirring rod, a capacitor, and a nitrogen introduction tube were mounted on the flask. The resultant flask was placed in a mantle heater. Next, the inside of the flask was purged with a nitrogen gas, and then the temperature was gradually increased under stirring. The materials were subjected to a reaction for 2 hours under stirring at a temperature of 200° C. After that, 5.8 parts (0.030 part by mole) of trimellitic anhydride was added to the resultant, and the mixture was subjected to a reaction at 180° C. for 10 hours, to thereby provide a polyester resin A2 as a binder resin component. The polyester resin A2 had an acid value of 10 mg KOH/g.

Production Example of Toner Particles 1

| | |
|---|---|
| Polyester resin A1 | 70.0 parts |
| Polyester resin A2 | 30.0 parts |
| Fischer-Tropsch wax (peak temperature at maximum endothermic peak: 78° C.) | 5.0 parts |
| C.I. Pigment Blue 15:3 | 5.0 parts |
| Aluminum 3,5-di-t-butylsalicylate compound | 0.1 part |

The raw materials shown in the above-mentioned formulation were mixed with a Henschel mixer (Model FM-75, manufactured by Nippon Coke & Engineering Co., Ltd.) at a number of revolutions of 20 $s^{-1}$ for a time of revolution of 5 minutes. After that, the mixture was kneaded with a twin screw kneader (Model PCM-30 manufactured by Ikegai Corp.) set to a temperature of 125° C. and a number of revolutions of 300 rpm. The resultant kneaded product was cooled and coarsely pulverized with a hammer mill to a diameter of 1 mm or less, to thereby provide a coarsely pulverized product. The resultant coarsely pulverized product was finely pulverized with a mechanical pulverizer (T-250, manufactured by Freund-Turbo Corporation). Further, the finely pulverized product was classified with a rotary classifier (200TSP, manufactured by Hosokawa Micron Corporation) to provide toner particles 1. The operating condition of the rotary classifier (200TSP, manufactured by Hosokawa Micron Corporation) was as follows: classification was performed at a number of revolutions of a classification rotor of 50.0 $s^{-1}$. The resultant toner particles 1 had a weight-average particle diameter (D4) of 5.9 μm.

Production Example of Toner 1

| | |
|---|---|
| Toner particles 1 | 100 parts |
| External additive 1 for toner | 6.0 parts |

The above-mentioned materials were mixed with a Henschel mixer Model FM-IOC (manufactured by Mitsui Miike Chemical Engineering Machinery, Co., Ltd.) at a number of revolutions of 30 $s^{-1}$ for a time of revolution of 10 min to provide a toner 1.

Production Examples of Toners 2 to 25

Toners 2 to 25 were obtained by performing production in the same manner as in the production example of the toner 1 except that the external additive for toner and the addition amount thereof were changed as shown in Table 2. The physical properties of the toners 2 to 25 are shown in Table 2.

TABLE 2

| Toner No. | Toner particle No. | External additive for toner No. | External additive for toner Addition amount (parts) |
|---|---|---|---|
| Toner 1 | Toner particle 1 | 1 | 6.0 |
| Toner 2 | Toner particle 1 | 1 | 0.2 |
| Toner 3 | Toner particle 1 | 1 | 18.0 |
| Toner 4 | Toner particle 1 | 1 | 21.0 |
| Toner 5 | Toner particle 1 | 1 | 0.05 |
| Toner 6 | Toner particle 1 | 2 | 6.0 |
| Toner 7 | Toner particle 1 | 3 | 6.0 |
| Toner 8 | Toner particle 1 | 4 | 6.0 |
| Toner 9 | Toner particle 1 | 5 | 6.0 |
| Toner 10 | Toner particle 1 | 6 | 6.0 |
| Toner 11 | Toner particle 1 | 7 | 6.0 |
| Toner 12 | Toner particle 1 | 8 | 6.0 |
| Toner 13 | Toner particle 1 | 9 | 6.0 |
| Toner 14 | Toner particle 1 | 10 | 6.0 |
| Toner 15 | Toner particle 1 | 11 | 6.0 |
| Toner 16 | Toner particle 1 | 12 | 6.0 |
| Toner 17 | Toner particle 1 | 13 | 6.0 |
| Toner 18 | Toner particle 1 | 14 | 6.0 |
| Toner 19 | Toner particle 1 | 15 | 6.0 |
| Toner 20 | Toner particle 1 | 16 | 6.0 |
| Toner 21 | Toner particle 1 | 17 | 6.0 |
| Toner 22 | Toner particle 1 | 18 | 6.0 |
| Toner 23 | Toner particle 1 | 19 | 6.0 |
| Toner 24 | Toner particle 1 | 20 | 6.0 |
| Toner 25 | Toner particle 1 | 21 | 6.0 |

Production Example of Carrier 1

Magnetite 1 having a number-average particle diameter of 0.30 μm (magnetization intensity under a magnetic field of 1,000/4π (kA/m) of 65 $Am^2/kg$)

Magnetite 2 having a number-average particle diameter of 0.50 μm (magnetization intensity under a magnetic field of 1,000/4π (kA/m) of 65 $Am^2/kg$)

To 100 parts of each of the above-mentioned materials, 4.0 parts of a silane compound (3-(2-aminoethylaminopropyl)trimethoxysilane) was added, and the mixture was subjected to high-speed mixing and stirring at 100° C. or more in a vessel to treat fine particles of each material.

Next, the following materials were placed in a flask.

Phenol: 10 parts

Formaldehyde solution: 6 parts (formaldehyde: 40 mass %, methanol: 10 mass %, water: 50 mass %)

Magnetite 1 treated with the above-mentioned silane compound: 58 parts

Magnetite 2 treated with the above-mentioned silane compound: 26 parts 28 mass % aqueous ammonia solution: 5 parts Water 20 parts While the contents were stirred and mixed, the temperature was increased to 85° C. in 30 minutes and held to perform a polymerization reaction for 3 hours to cure a produced phenol resin. After that, the cured phenol resin was cooled to 30° C., and water was added. After that, the supernatant was removed, and the precipitate was washed with water and then air-dried. Then, the air-dried product was dried under reduced pressure (5 mmHg or less) at a temperature of 60° C. to provide a spherical carrier 1 of a magnetic material dispersion type. The 50% particle diameter (D50) of the carrier on a volume basis was 34.2 μm.

Production Example of Two-Component Developer 1

8.0 Parts of the toner 1 was added to 92.0 parts of the carrier 1, and the contents were mixed with a V-type mixer (V-20 manufactured by Seishin Enterprise Co., Ltd.) to provide a two-component developer 1.

Production Examples of Two-Component Developers 2 to 25

Two-component developers 2 to 25 were obtained in the same manner as in the production example of the two-component developer 1 except that the toner 1 was changed to the toners 2 to 25, respectively.

Example 1

<Method of Evaluating Toner>

A full-color copying machine imagePRESS C800 manufactured by Canon Inc. was used as an image forming apparatus. The above-mentioned two-component developer 1 was loaded into a developing unit for cyan of the image forming apparatus, and the above-mentioned toner 1 was loaded into a toner container for cyan. Then, evaluations described later were performed.

As the reconstructed point, a mechanism for discharging a magnetic carrier, which became excessive in the developing unit, from the developing unit was removed. The toner laid-on level on paper in an FFh image (solid image) was adjusted to be 0.45 $mg/cm^2$. FFh is a value obtained by representing 256 gradations in hexadecimal notation; 00 h represents the first gradation (white portion) of the 256 gradations, and FFh represents the 256th gradation (solid portion) of the 256 gradations.

(1) Measurement of Change in Image Density at Image Ratio of 5%

As evaluation paper, plain paper GF-C081 (A4, basis weight: 81.4 $g/m^2$, available from Canon Marketing Japan Inc.) was used.

An image output test on 10,000 sheets was performed at an image ratio of 5%. During the continuous passage of 10,000 sheets, sheet passage was performed under the same development and transfer conditions (without calibration) as those of the first sheet.

The above-mentioned test was performed under a normal-temperature and normal-humidity environment (temperature: 25° C., relative humidity: 55%). Measurement of an initial density (first sheet) and the density of an image on the 10,000th sheet in printing at an image ratio of 5% was performed through use of an X-Rite color reflectance densitometer (500 series: manufactured by X-Rite Inc.), and ranking was performed based on the following criteria through use of a difference A between the densities. C or higher was determined to be satisfactory.

(Evaluation Criteria: Image Density Difference Δ)

A: less than 0.02

B: 0.02 or more and less than 0.05

C: 0.05 or more and less than 0.10

D: 0.10 or more (2) Method of Evaluating Charge Rising Property Under Normal-Temperature and Low-Humidity Environment The charge rising property was evaluated by measuring a change in density when images having different image print ratios were output. The charge of a toner in a developing unit is saturated by outputting an image having a low image ratio, and then an image having a high image ratio is output. Then, a change in density occurs due to the difference in charge between the toner having the charge saturated in the developing unit and a toner to be newly supplied into the developing unit. In the case of a toner having fast charge rising, the charge is saturated immediately after the toner is supplied into the developing unit, and hence a change in density is small. Meanwhile, in the case of a toner having slow charge rising, it takes time for the charge to be saturated after the toner is supplied into the developing unit, and hence the charge amount of the entire toner is decreased, resulting in a change in density.

First, an image output test on 1,000 sheets was performed at an image ratio of 1%. During the continuous passage of 1,000 sheets, sheet passage was performed under the same development and transfer conditions (without calibration) as those of the first sheet. After that, an image output test on 1,000 sheets was performed at an image ratio of 80%. During the continuous passage of 1,000 sheets, sheet passage was performed under the same development and transfer conditions (without calibration) as those of the first sheet. The density of an image on the 1,000th sheet in printing at an image ratio of 1% was defined as an initial density. Under this condition, the density of an image on the 1,000th sheet in printing at an image ratio of 80% was measured, evaluation was performed based on the following criteria. The above-mentioned tests were performed under a normal-temperature and low-humidity environment (N/L; temperature: 23° C., relative humidity: 5%).

(Measurement of Change in Image Density)

Measurement of an initial density and the density of an image on the 1,000th sheet in printing at an image ratio of 80% was performed through use of an X-Rite color reflectance densitometer (500 series: manufactured by X-Rite Inc.), and a difference between the image densities was ranked based on the following criteria. C or higher was determined to be satisfactory.

(Evaluation Criteria: Density Difference Δ)

A: Less than 0.02

B: 0.02 or more and less than 0.05

C: 0.05 or more and less than 0.10

D: 0.10 or more (3) Method of Evaluating Transferability after Endurance

After image output on 100,000 sheets at an image ratio of 1% under a normal-temperature and low-humidity environment (temperature: 25° C., relative humidity: 5%), a solid image was output. A transfer residual toner on a photosensitive member (photosensitive drum) at the time of formation of the solid image was taped with a transparent adhesive tape made of polyester, and the adhesive tape was torn off.

The adhesive tape that was torn off was attached onto paper, and the density thereof was measured with a spectral densitometer (500 series: manufactured by X-Rite Inc.). In addition, an adhesive tape alone was attached onto paper, and the density in this case was also measured. A density difference A was calculated by subtracting the latter density from the former density, and the density difference A was evaluated based on the following evaluation criteria.

During the continuous image output on 100,000 sheets, image output was performed under the same development and transfer conditions (without calibration) as those of the first sheet. In an image output endurance test on 100,000 sheets, copy plain paper CS-680 (A4 paper, basis weight: 68 $g/m^2$, available from Canon Marketing Japan Inc.) was used as a transfer material for evaluation. Copy paper Multi-Purpose Paper: commonly known as Boise Paper (A4 paper, basis weight: 75 $g/m^2$, available from Canon U.S.A., Inc.) was used for the solid image after the output test. Evaluation was performed as described below. C or higher was determined to be satisfactory.

(Evaluation Criteria: Density Difference Δ)

A: less than 0.02

B: 0.02 or more and less than 0.05

C: 0.05 or more and less than 0.10

D: 0.10 or more

The above-mentioned evaluation results are shown in Table 3.

Examples 2 to 19

The two-component developers 2 to 19 were each evaluated in the same manner as in Example 1. The evaluation results of Examples 2 to 19 are shown in Table 3.

Comparative Examples 1 to 6

The two-component developers 20 to 25 were each evaluated in the same manner as in Example 1. The evaluation results of Comparative Examples 1 to 6 are shown in Table 3.

TABLE 3

| | Two-component | Change in image density (5%) | | Charge rising property | | Transferability after endurance | |
|---|---|---|---|---|---|---|---|
| | developer No. | Value | Rank | Value | Rank | Value | Rank |
| Example 1 | Two-component developer 1 | 0.01 | A | 0.02 | B | 0.01 | A |
| Example 2 | Two-component developer 2 | 0.02 | B | 0.03 | B | 0.01 | A |
| Example 3 | Two-component developer 3 | 0.02 | B | 0.01 | A | 0.02 | B |

TABLE 3-continued

| | Two-component developer No. | Change in image density (5%) Value | Rank | Charge rising property Value | Rank | Transferability after endurance Value | Rank |
|---|---|---|---|---|---|---|---|
| Example 4 | Two-component developer 4 | 0.01 | A | 0.01 | A | 0.04 | B |
| Example 5 | Two-component developer 5 | 0.02 | B | 0.04 | B | 0.01 | A |
| Example 6 | Two-component developer 6 | 0.04 | B | 0.01 | A | 0.01 | A |
| Example 7 | Two-component developer 7 | 0.01 | A | 0.01 | A | 0.05 | C |
| Example 8 | Two-component developer 8 | 0.02 | B | 0.02 | B | 0.02 | B |
| Example 9 | Two-component developer 9 | 0.01 | A | 0.06 | C | 0.01 | A |
| Example 10 | Two-component developer 10 | 0.04 | B | 0.07 | C | 0.04 | B |
| Example 11 | Two-component developer 11 | 0.04 | B | 0.06 | C | 0.04 | B |
| Example 12 | Two-component developer 12 | 0.05 | C | 0.08 | C | 0.05 | C |
| Example 13 | Two-component developer 13 | 0.01 | A | 0.05 | C | 0.01 | A |
| Example 14 | Two-component developer 14 | 0.05 | C | 0.01 | A | 0.05 | C |
| Example 15 | Two-component developer 15 | 0.01 | A | 0.04 | B | 0.01 | A |
| Example 16 | Two-component developer 16 | 0.04 | B | 0.01 | A | 0.04 | B |
| Example 17 | Two-component developer 17 | 0.01 | A | 0.01 | A | 0.01 | A |
| Example 18 | Two-component developer 18 | 0.05 | C | 0.01 | A | 0.05 | C |
| Example 19 | Two-component developer 19 | 0.05 | C | 0.05 | C | 0.05 | C |
| Comparative Example 1 | Two-component developer 20 | 0.13 | D | 0.12 | D | 0.11 | D |
| Comparative Example 2 | Two-component developer 21 | 0.14 | D | 0.15 | D | 0.13 | D |
| Comparative Example 3 | Two-component developer 22 | 0.15 | D | 0.01 | A | 0.15 | D |
| Comparative Example 4 | Two-component developer 23 | 0.11 | D | 0.12 | D | 0.15 | D |
| Comparative Example 5 | Two-component developer 24 | 0.15 | D | 0.01 | A | 0.11 | D |
| Comparative Example 6 | Two-component developer 25 | 0.13 | D | 0.08 | C | 0.12 | D |

The external additive for toner of the present disclosure improves the durable stability and charge rising property of a toner and enables a high-quality image to be obtained stably for along period of time.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-183913, filed Nov. 17, 2022, which is hereby incorporated by reference herein in its entirety.

What is claimed is:

1. An external additive for toner comprising an external additive particle containing:

a base particle A; and a plurality of convex forming particles B each configured to form a convex portion on a surface of the base particle A, wherein the base particle A and the plurality of convex forming particles B are particles each containing a silicon compound having a siloxane bond, and a chemical bond is formed between the base particle A and each of the plurality of convex forming particles B, wherein the base particle A has a total content of the following unit (a), unit (b), and unit (c) of 80 mass % or more and 100 mass % or less, wherein the plurality of convex forming particles B each have a total content of the following unit (a), unit (b), and unit (c) of 80 mass % or more and 100 mass % or less, wherein the external additive for toner has a Young's modulus of 10 GPa or more and 30 GPa or less, wherein the external additive for toner has a number-average particle diameter of 0.03 μm or more and 0.30 μm or less, and wherein, when the number-average particle diameter of the external additive for toner is represented by $D_A$, and an average height of the convex portions derived from the plurality of convex forming particles B on a surface of the external additive particle is represented by H, $H/D_A$ is 0.10 or more and 0.30 or less:

(a)

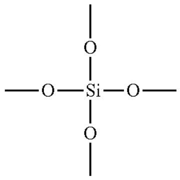

(b)

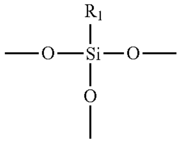

(c)

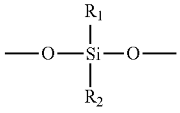

where $R_1$ and $R_2$ each represent an alkyl group having 1 or more and 6 or less carbon atoms.

2. The external additive for toner according to claim 1, wherein, when an average maximum diameter of the plurality of convex forming particles B is represented by $D_B$, $H/D_A$ is 0.30 or more and 0.50 or less with respect to the average height H of the convex portions.

3. The external additive for toner according to claim 1, wherein the $H/D_A$ is 0.15 or more and 0.25 or less.

4. The external additive for toner according to claim 1, wherein content ratios of the unit (a), the unit (b), and the unit (c) in the base particle A and each of the plurality of convex forming particles B satisfy the following expressions (I), (II), and (III)

$$0.30 \le (a)/((a)+(b)+(c)) \le 0.80 \quad \text{(I)}$$

$$0 \le (b)/((a)+(b)+(c)) \le 0.50 \quad \text{(II)}$$

$$0.20 \le (c)/((a)+(b)+(c)) \le 0.70 \quad \text{(III)}$$

5. The external additive for toner according to claim 1, wherein a content ratio of the unit (a) in each of the plurality of convex forming particles B is larger than a content ratio of the unit (a) in the base particle A.

6. A toner comprising:

a toner particle; and an external additive for toner, wherein the external additive for toner includes an external additive particle containing:

a base particle A; and a plurality of convex forming particles B each configured to form a convex portion on a surface of the base particle A, wherein the base particle A and the plurality of convex forming particles B are particles each containing a silicon compound having a siloxane bond, and a chemical bond is formed between the base particle A and each of the plurality of convex forming particles B, wherein the base particle A has a total content of the following unit (a), unit (b), and unit (c) of 80 mass % or more and 100 mass % or less, wherein the plurality of convex forming particles B each have a total content of the following unit (a), unit (b), and unit (c) of 80 mass % or more and 100 mass % or less, wherein the external additive for toner has a Young's modulus of 10 GPa or more and 30 GPa or less, wherein the external additive for toner has a number-average particle diameter of 0.03 μm or more and 0.30 μm or less, and wherein, when the number-average particle diameter of the external additive for toner is represented by $D_A$, and an average height of the convex portions derived from the plurality of convex forming particles B on a surface of the external additive particle is represented by H, $H/D_A$ is 0.10 or more and 0.30 or less:

(a)

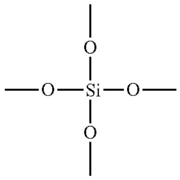

(b)

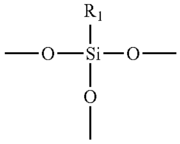

(c)

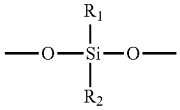

where $R_1$ and $R_2$ each represent an alkyl group having 1 or more and 6 or less carbon atoms.

7. The toner according to claim 6, wherein a content of the external additive for toner with respect to 100 parts by mass of the toner particle is 0.1 part by mass or more and 20.0 parts by mass or less.

* * * * *